A. BECKSTROM.
ELECTRIC INCUBATOR AND NURSERY.
APPLICATION FILED MAR. 11, 1909.

982,462.

Patented Jan. 24, 1911.
2 SHEETS—SHEET 1.

Witnesses

Inventor
Adolf Beckstrom
By C. A. Snow & Co.
Attorneys

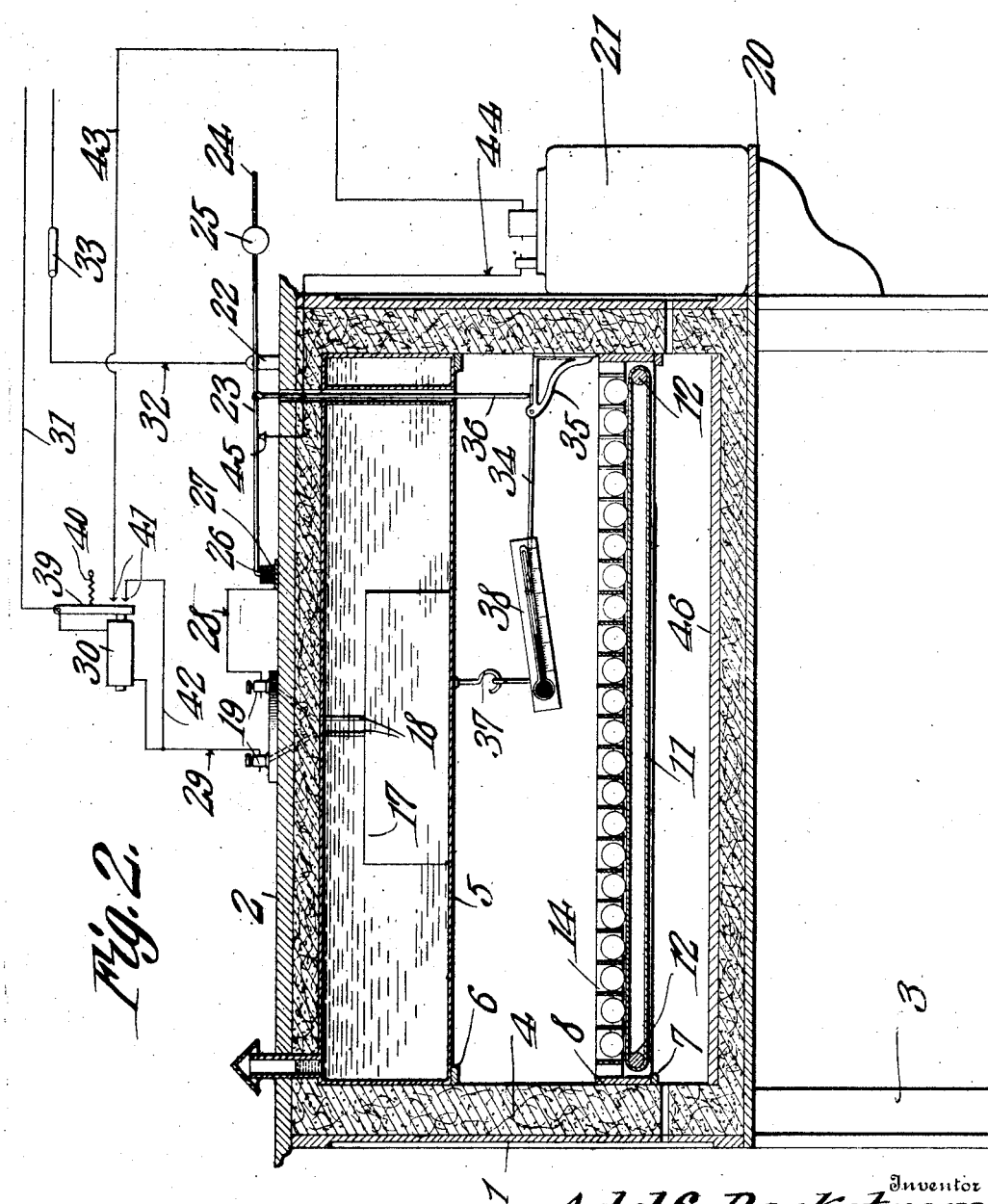

UNITED STATES PATENT OFFICE.

ADOLF BECKSTROM, OF LEWISTOWN, MONTANA.

ELECTRIC INCUBATOR AND NURSERY.

982,462.  Specification of Letters Patent.  Patented Jan. 24, 1911.

Application filed March 11, 1909. Serial No. 482,722.

*To all whom it may concern:*

Be it known that I, ADOLF BECKSTROM, a citizen of the United States, residing at Lewistown, in the county of Fergus and State of Montana, have invented a new and useful Electric Incubator and Nursery, of which the following is a specification.

This invention has reference to electric incubators and nurseries wherein the heat is generated by an electric current and its object is to provide a means for the hatching of eggs and the keeping of the chicks after hatching wherein an electric current is utilized for the production of the necessary heat and water is utilized for the proper distribution of the heat generated by the electric heater while provision is made for the regulation of the heat and the turning of the eggs when necessary without requiring the removal of the eggs from the incubator, and also provision is made whereby a local current supply will maintain the heater in operation should the main supply fail from any cause.

Figure 1:
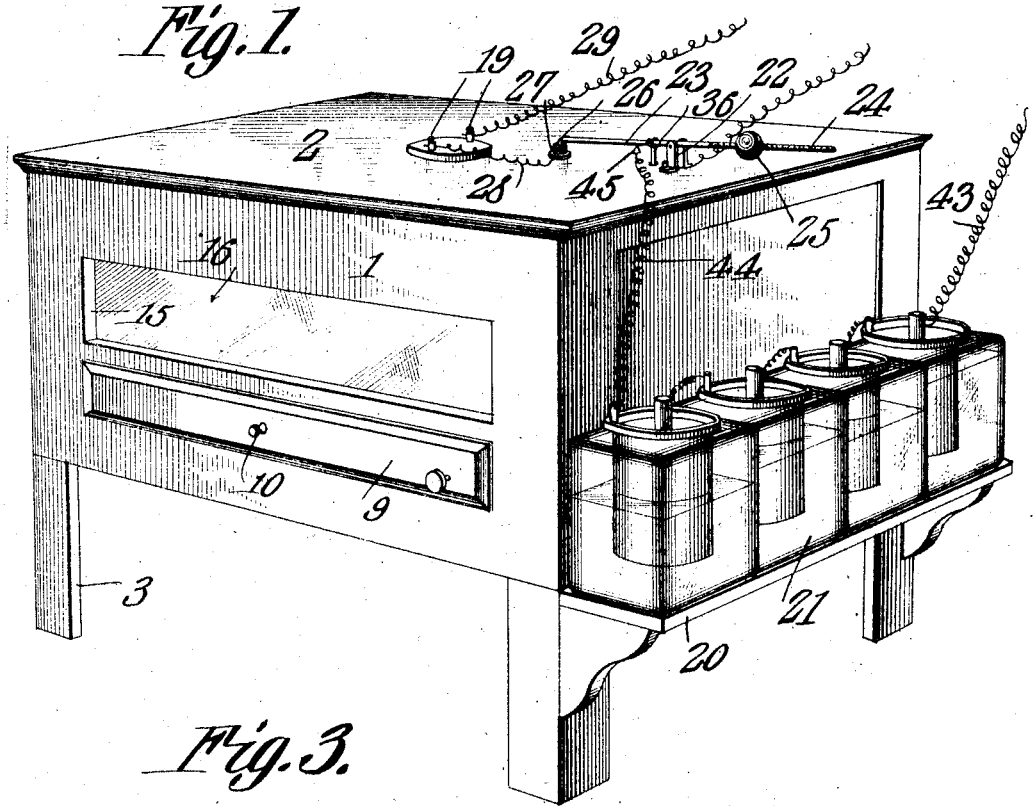
Figure 3:
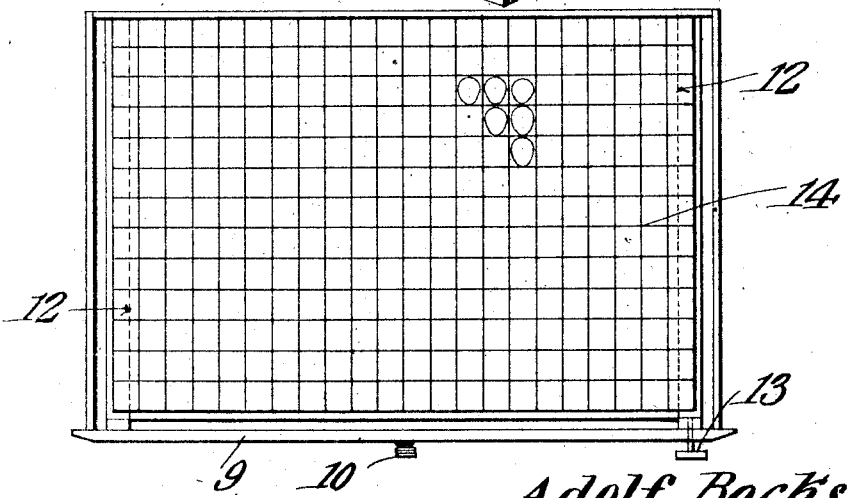

The invention will be best understood from a consideration of the following detail description taken in connection with the accompanying drawings forming a part of this specification, in which drawings, Figure 1 is a perspective view of the improved incubator and nursery. Fig. 2 is a longitudinal vertical central section through the same with electric circuits shown diagrammatically. Fig. 3 is a plan view of the egg tray removed.

Referring to the drawings there is shown a suitable casing 1 provided with a top 2 and supported upon suitable legs 3. The casing may be made of wood or other suitable material and inside the same there is a lining 4 of some suitable material for retaining heat within the casing and preventing its dissipation therefrom. Within the casing at the top thereof there is formed a water chamber within a suitable tank 5, the said tank 5 being supported upon ledges 6 fast to the sides of the inner walls of the casing, or any other means for supporting said tank may be provided. The bottom of the tank 5 is sufficiently elevated above the bottom of the chamber formed within the casing 1 to provide ample room for the eggs and for the chicks after hatching. At an intermediate point within the casing are other ledges 7 adapted to receive a frame 8 provided with a front panel 9 so that the frame may be inserted through a suitable opening in one wall of the casing and when fully inserted and resting on the ledges 7 the front panel 9 will close the opening as indicated in Fig. 1. This frame is provided with a handle 10 for enabling the operator to readily withdraw the frame when desired.

Extending across the frame is an endless belt 11 mounted at the ends upon rollers 12, the arbor of one of the rollers being extended out through the panel 9 and there provided with a manipulating handle 13 by means of which the roller may be rotated upon its longitudinal axis and thus cause the endless belt 11 to move longitudinally of the frame. The belt is supported in the lower portion of the frame 8 while the upper portion is formed into series of pockets by cross partitions 14, the pockets being of such size and shape as to accommodate eggs to be hatched, which eggs rest upon and are supported by the upper run of the endless belt 11.

When the frame 8 is inserted into the interior of the incubator then the eggs are supported a distance above the bottom of the chamber within the incubator and within proper distance of the bottom of the tank 5. Whenever it is necessary to turn the eggs then the handle 13 is manipulated to a sufficient extent and the eggs may be all turned at one time without removing the frame from the incubator and thereby preventing the danger of chilling the eggs or cooling the interior of the incubator. Above the point where the frame 8 is inserted the wall of the casing 1 may be provided with an opening 15 closed by a transparent panel 16 through which the interior of the incubator becomes visible.

Within the water chamber or tank 5 there is located an electric heater 17 of any suitable type and since the particular structure of the heater may be such as that of heaters found on the market and also since it forms no part of the present invention the interior structure of the heater is not shown. The terminals 18 of the heater conductors are carried to the exterior of the casing through the top 2 and may terminate at binding posts 19.

The incubator may be provided with an exterior shelf 20 carrying batteries 21 as a local source of current, but it will be understood that these batteries may be located at any convenient point adjacent to the incubator and not necessarily upon a shelf carried by the casing 1.

Mounted on the cover 2 in a suitable standard 22 is a lever 23 one end 24 of which is screw-threaded and carries an adjustable counterweight 25. The end of the lever 23 remote from the threaded end 24 may be formed into a contact point 26 engaging a circuit terminal 27, which because of the practical absence of mechanical resistance offered may be a mercury cup. This contact 27 is connected by a conductor 28 to one of the binding posts 19. The other binding post 19 is connected by a conductor 29 through an electromagnet 30 to a conductor 31 which may come from any suitable source of electric current as for instance a power circuit. The post or standard 22 is connected to the other conductor 32 of the power circuit, which latter conductor may include a switch 33.

Within the interior of the incubator there is mounted a delicate lever 34 pivoted to a bracket 35 and in the path of one arm of this lever is a rod 36 extending to and pivoted to the lever 23 so that when the lever 34 is moved the lever 23 will participate in such movement.

Nicely balanced in the interior of the incubator as by a hanger 37 is a thermometer 38 having the end remote from the hanger 37 connected to or engaging the lever 34. The adjustment is such that while the temperature within the incubator is below a certain predetermined maximum the weight of the lever 23 on the side remote from the counterweight 25 is sufficient to maintain the end of the lever 34 connected to the thermometer 38 in an elevated position so that the contacts 26 and 27 are in engagement and the current flows through the heater in the usual manner. When the heat has risen beyond the predetermined maximum then the movement of the mercury in the thermometer along the tube is sufficient to overbalance the lever 34 thus causing the lever 23 to rise and to break the circuit between the contacts 26 and 27 thereby cutting off the supply of current and ultimately the radiation of heat will cause the interior of the incubator to cool down until the retraction of the mercury column is sufficient to permit the weight of the lever 23 to again raise the lever 24 and thermometer until the contacts 26 and 27 are brought into engagement and current again flows through the heater. By this structure there is provided a very delicate and sensitive regulator responsive to heat changes within the incubator and thereby maintaining the heat within the incubator very sensibly constant at the proper temperature.

It transpires that sometimes the power circuit will fail and unless provision is made for such failure the eggs within the incubator may become chilled and fail to hatch even though the power circuit be again established at a later time. To avoid this contingency there is provided another source of electric power in the form of a battery 21, which should be sufficient to supply current enough to the heater 17 to raise the heat therein to the same temperature as is provided by the power circuits 31, 32. The showing of the drawings with respect to the battery 21 is not to be taken as more than simply illustrative. It is evident that irrespective of the showing of the drawings the battery 21 will in practice be made of sufficient capacity to give the required output of current.

The magnet 30 is provided with an armature 39 attracted by the magnet so long as the current flows therethrough but should the current passing through the magnet 30 cease then a suitable retractile spring 40 will move the armature 39 away from the magnet until it is brought into engagement with two adjacent contact terminals 41. One of these terminals is connected by a conductor 42 to the conductor 29 and the other terminal 41 is connected by a conductor 43 to one side of the battery 21. The other side of the battery 21 is connected by a conductor 44 to a contact terminal 45 in the path of the lever 23 and engaged by the latter when the contacts 26 and 27 are in engagement. Should the main current supply through the conductors 31 and 32 cease then the magnet 30 is deenergized and the armature 39 is carried by the spring 40 into position to bridge the contacts 41 thus establishing a circuit from the battery 21 through the conductor 43 and contact 41 to the conductor 42 thence to the conductor 29 and corresponding binding post 19 and through the heater 17 returning to the battery through conductor 28, contact terminals 26 and 27, lever 23, contact 45, and conductor 44. Should the heat within the incubator become too great then when the lever 23 is raised the circuit is broken at the contact 45 as well as at the contacts 26 and 27. The contact 45 becomes necessary in the normal operation of the machine for when the temperature becomes too high the contacts 26 and 27 are separated and the main circuit is broken thus deënergizing the magnet 30 which under these circumstances closes the circuit between the contacts 41 but the raising of the lever has already broken the circuit at the contact 45 and thus the battery 21 is not put in service when the contacts 26 and 27 are separated by a too high temperature within the incubator. The contact 35 is only diagrammatically illustrated and may be the same as the contacts 26 and 27 or if desired, both contacts may be of the ordinary type.

It is to be observed that with the use of the electric heater a very sensitive regulation of the heat is obtainable and by immersing the heater in the water contained in the water tank 5 a well distributed and very constant source of heat is obtained wherein there is no danger of sudden changes.

When the eggs are hatched the frame 8 may be removed and the chicks allowed to be on the bottom board 46 of the interior chamber of the incubator, the opening normally closed by the panel 9 being closed by any suitable means. The device then becomes a nursery.

What is claimed is:—

1. An incubator provided with a suitable casing, an electric heater therein, a thermostatic element in the casing, a switch controlled by the thermostatic element and adapted to be included in an electric circuit, a current source local to the incubator, a switch controlling the said local current source and in turn controlled by current traversing the said electric circuit to cut the local source in and out of circuit in accordance with the failure or restoration of current in the first named circuit, and a circuit terminal for the local current source in the path of the thermostatically controlled switch.

2. An incubator provided with a suitable casing, an electric heater therein adapted to be included in an electric circuit, a thermostatic element in the casing, a current source local to the incubator, a switch controlling the local current source and in turn adapted to be controlled by current traversing the said electric circuit to cut the local current source into and out of circuit on the failure or restoration of current in the first named circuit, and a switch controlled by the thermostatic element for cutting in or cutting out the first named circuit or the local current source according to whether the first named circuit or the local current source is active.

In testimony that I claim the foregoing as my own, I have hereto affixed my signature in the presence of two witnesses.

ADOLF BECKSTROM.

Witnesses:
  EDGAR G. WORDEN,
  VIVIAN ST. CLAIR.